United States Patent [19]

Pottinger

[11] 3,945,422
[45] Mar. 23, 1976

[54] TIRE WITH NO PLY STEER BELT
[75] Inventor: Marion G. Pottinger, Akron, Ohio
[73] Assignee: The B. F. Goodrich Company, Akron, Ohio
[22] Filed: Jan. 8, 1975
[21] Appl. No.: 539,390

[52] U.S. Cl. .................. 152/361 DM; 152/361 R
[51] Int. Cl.² ........................................ B60C 9/22
[58] Field of Search.... 152/361 R, 361 DM, 361 FP, 152/330 R

[56] References Cited
UNITED STATES PATENTS

| | | | |
|---|---|---|---|
| 2,826,233 | 3/1958 | Cooper | 152/361 R |
| 3,335,777 | 8/1967 | Hutch | 152/361 R |
| 3,392,774 | 7/1968 | Le Bosse | 152/361 R |
| 3,516,468 | 6/1970 | Jones | 152/361 R |
| 3,583,463 | 6/1971 | O'Neil et al. | 152/361 R |
| 3,643,723 | 2/1972 | Mukai et al. | 152/361 DM |

*Primary Examiner*—Drayton E. Hoffman
*Attorney, Agent, or Firm*—Harry F. Pepper, Jr.; W. A. Shira, Jr.

[57] ABSTRACT

A radial ply pneumatic tire has a belt assembly which is constructed so that the laminated layers of rubberized parallel cord material in the belt are arranged in such a way that the lamina stiffnesses of the belt plies are symmetrically arranged with regard to the thickness midplane of the belt.

4 Claims, 17 Drawing Figures

TIRE WITH NO PLY STEER BELT

BACKGROUND OF THE INVENTION

This invention relates to tires and particularly to arrangements of belt structures in radial ply pneumatic tires.

When a pneumatic tire is operated at a zero slip angle, steady state lateral forces and aligning torques may be generated which cause the tire to turn slightly abouts its steering axis and to run at a slight angle of deviation from the direction in which it is steered. This phenomenon is most predominant in radial tires. It is caused by both conicity and ply steer.

Ply steer adversely affects the performance of an automobile in various ways. First, it can cause the steering wheel to assume a steered configuration, thus producing misalignment complaints, and can also cause dog tracking, which may in turn cause headlight misalignment. Second, the lateral forces which act in the area of contact of the tread region of the tire may also affect some types of wheel alignment equipment. Finally, ply steer may be a cause of faster tread wear and the mechanical source of ply steer may be a contributing cause of conicity due to its action during lifting, i.e., shaping of the tire to torodial form.

Since the carcass plies in radial tires contribute minimally to the ply steer phenomenon, a no ply steer radial tire may be designed by mounting a no ply steer belt on a radial ply carcass.

In the specification, the following terms shall have the meaning defined below:

A radial tire is a tire having a carcass comprising one or more carcass plies of rubberized parallel cord material wherein the angle of the cords to the mid circumferential plane of the tire is equal or substantially equal to 90°.

The direction of a cord angle is defined to be positive (+) when an observer who inspects the outer surface of the tire along a line of sight which is perpendicular to the axis of the tire when the tire is in a rolling position on the ground and sees the cords running from the bottom up from left to right. Similarly, a cord angle is negative (−) when it runs from right to left from the bottom up. When a belt is described with reference to the directions of the cords in each ply, the first sign given refers to the ply which is closest to the spin axis of the tire. For example, a + − belt is a belt having its ply closest to the spin axis of the tire having cords in the + direction, and its outermost ply having cords in the − direction.

Stiffness parallel with the cords is the effective elastic modulus ($E_{eff}$) of the ply in that direction as defined by the rule of Mixture's Equation:

$E_{eff}$ = (% Area of cord x elastic modulus of cord + %Area of rubber x elastic modulus of rubber)/100. See, e.g. Ashton, Halpin & Petit, *Primer on Composite Materials Analysis*, (Technomic Pub. 1969, Stamford, Connecticut).

The term lamina stiffness will be used to characterize the stiffness properties of a ply. It will be taken to be synonymous in meaning with stiffness parallel with the cords and is used for the sake of brevity.

Aligning torque is the moment exerted on the tire by virtue of its reaction to contact with the road surface and which acts about an axis perpendicular to the road plane and passing through the center of tire contact. Aligning torque is positive when acting clockwise as seen from above.

The lateral force is the force exerted by the road surface upon the tire and which is in the road plane perpendicular to the wheel plane. It is positive when active to the right as viewed from behind the tire.

Wheel plane is the central plane of the tire, normal to the tire spin axis.

Steer angle is the angle through which the front wheels of a car have turned from the straight ahead position. In other words, it is the angle between the projection of the longitudinal axis of the vehicle and the line of intersection of the wheel plane and the road surface.

Slip angle is the angle between the velocity vector of the center of tire contact and the intersection of the wheel and the road planes.

Center of tire contact is the intersection in the road plane of the wheel plane and the vertical projection of the tire spin axis onto the road plane.

Conicity (pseudo camber) is that component of the average lateral force, when the tire rolls at zero slip angle, which does not change direction with respect to the wheel plane when the direction of rotation of the tire changes.

Ply steer (pseudo slip) is that component of the average lateral force of the tire rolling at zero slip angle which changes direction with respect to the wheel plane when the direction of rotation of the tire changes. It is known as "ply steer" because it is related to the geometrical arrangement of the various cord directions of the plies in the tire.

SUMMARY OF THE INVENTION

The invention may be briefly characterized as comprising a radial tire construction in which the phenomena of ply steer is eliminated, or substantially reduced, by so constructing the belt of the tire that the stiffness of the multiple layers of rubber-covered cords comprising the belt are symmetrically disposed with respect to the midplane of the thickness of the belt.

THE DRAWINGS

FIG. 7c is a midplane element of the laminate shown in FIG. 7a;

Figure 10:
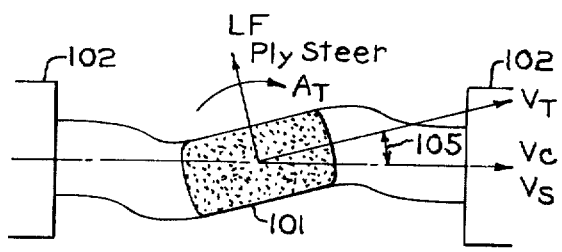
Figure 11:
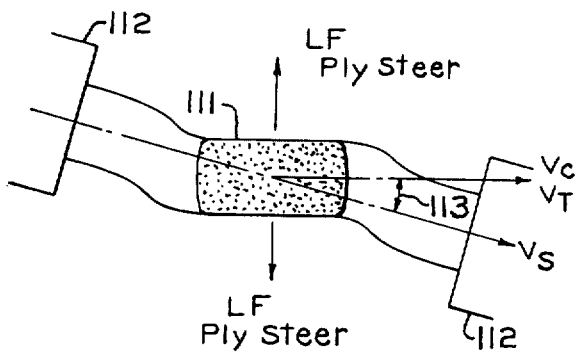
Figure 12:
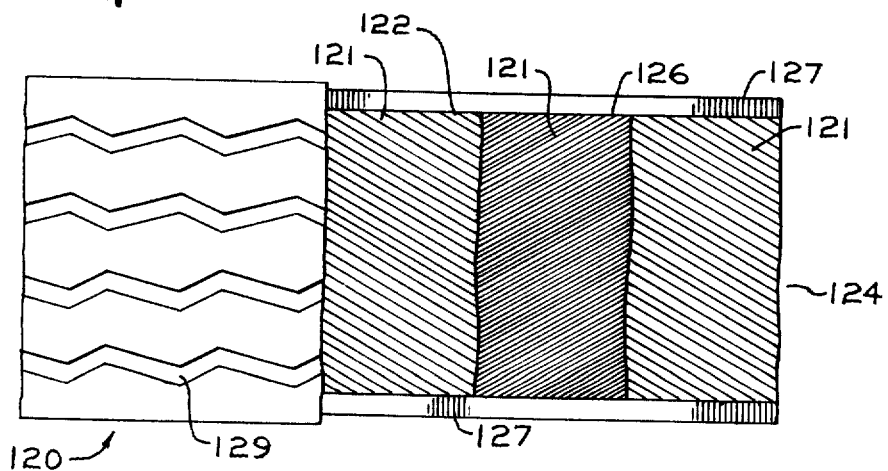

FIG. 10 is a schematic view of a tire and wheel combination showing the configuration of those portions of the tread region of the tire in contact with and in close proximity to the road, when the tire-wheel combination is mounted on an axle which has its steering angle fixed and the tire-wheel combination has been rolling along the road surface for a sufficient time to build up a steady state ply steer effect;

FIG. 11 is a view similar to FIG. 10 showing the configuration of the tire-wheel combination in FIG. 10 when the axle steering angle is not fixed but is free to rotate in response to the ply steer aligning torque;

FIG. 12 is a fragmentary plan view of the tread region of a tire incorporating the presently preferred embodiment of this invention with a portion of the tread cut away to show the plies comprising the belt.

DETAILED DESCRIPTION

Ply steer is produced by forces resulting from nonsymmetrically arranged carcass and belt ply lamina in a tire. The interaction between the lamina causes the tread area of the tire to deform and this, in turn, causes the tire to roll at a small angle of deviation from the angle in which it is steered. Ply steer can be eliminated if the belt and carcass plies of the tire are arranged so that the lamina stiffnesses are oriented such that they are symmetrically arranged with regard to the thickness midplane of the structure. Moreover, for the simple case of a radial tire, ply steer will be substantially eliminated if the belt plies alone are symmetrically arranged with respect to the thickness midplane of the belt, since radial carcass plies do not make a significant ply steer contribution.

Figure 1A:
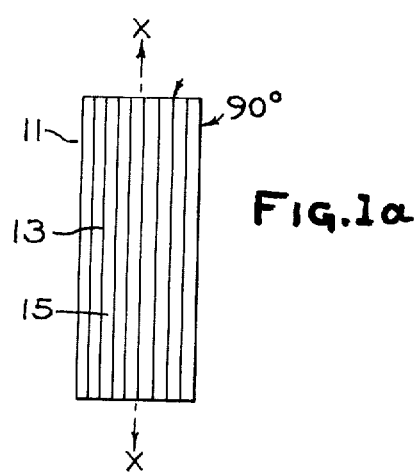
FIG. 1a is a schematic view of a lamina of spaced parallel cords embedded in an elastomer where the cords are at an angle of 0° with respect to the x axis.
Figure 1B:
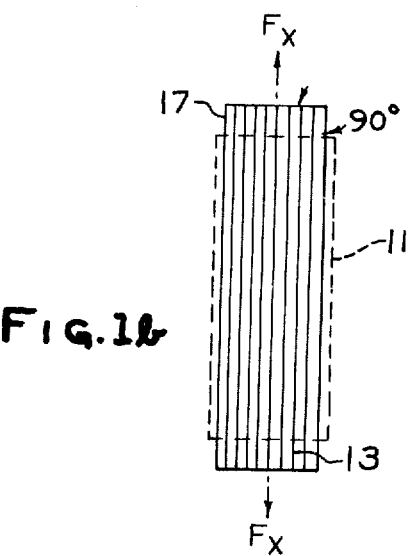
FIG. 1b is a schematic view of the lamina in FIG. 1a when tension is applied to the lamina along its x axis.

In order to fully understand how to build a no ply steer belt, the properties of laminates acted upon by forces must be understood. FIG. 1a shows a single lamina 11 of spaced parallel cords 13 connected by an elastomer 15 with the cords lying at an angle of 0° with respect to the x axis. When a force $F_x$ acts on this lamina in the + and − x directions, it undergoes plane strain, and tends to assume an elongated configuration 17 as shown in solid lines in FIG. 1b. It should be noticed that the elongated configuration 17 maintains a generally rectangular shape as the angles of the corners of the lamina remain 90°. Similarly, if the lamina were stretched along the y axis, it would remain rectangular but elongate in the y direction.

Figure 2A:
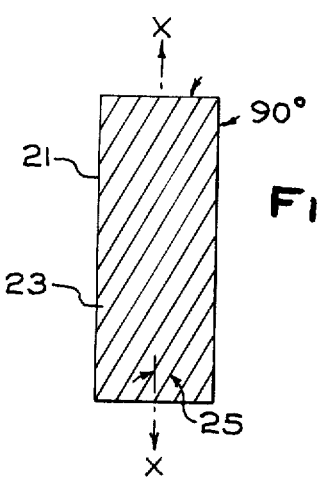
FIG. 2a is a schematic view of a lamina of spaced parallel cords embedded in an elastomer where the cords are at an acute angle with respect to the x axis.
Figure 2B:
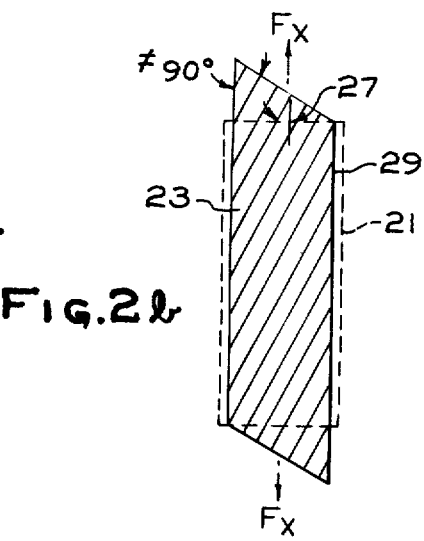
FIG. 2b shows the lamina in FIG. 2a when tension is applied to the lamina along its x axis.

However, if a lamina 21 has cords 23 lying at an angle 25, not equal to 0° or 90° with respect to the x axis, as in FIG. 2a and is stretched along the x axis, it will show an in-plane shear effect. That is, the angles of the cords 23 in the lamina 21 will be deformed so that the rectangular lamina 21 assumes the shape of a parallelogram 29, see FIG. 2b, and the cords 23 of the deformed lamina lie at a different angle 27 with respect to the x axis. The example shown is for a cord angle 25 of less than 60°. For a cord angle 25 of greater than 60° an opposite sense of distortion is obtained. This is what would happen to a single belt ply, having cords situated at the actual angle of 15° to 25°, if it were placed in tension and were not coupled to another ply. However, since the belt in a cured tire normally has a plurality of plies coupled in the z direction, out-of-plane coupling takes place when forces act on the belt.

Figure 3:
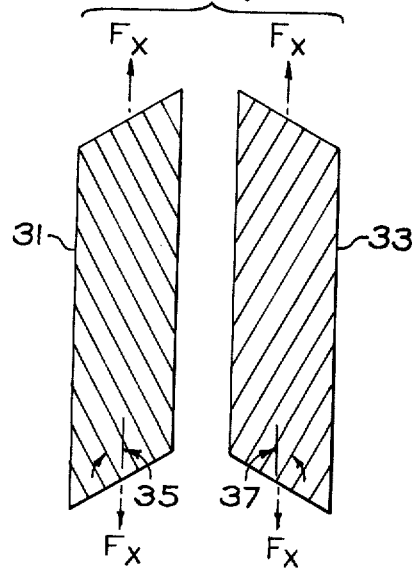
FIG. 3 is a schematic view of two separate lamina having spaced parallel cords embedded in an elastomer where the cords are at acute angle with respect to the x axis which is the same in magnitude but of opposite direction for each lamina, each lamina being shown in tension along its x axis.
Figure 4:
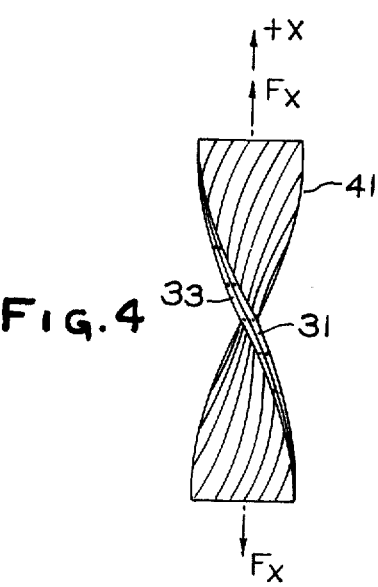
FIG. 4 shows the deformation of a laminate consisting of the two lamina shown in FIG. 3 which are coupled in the thickness z direction when the laminate is in tension along the x axis.
Figure 5:
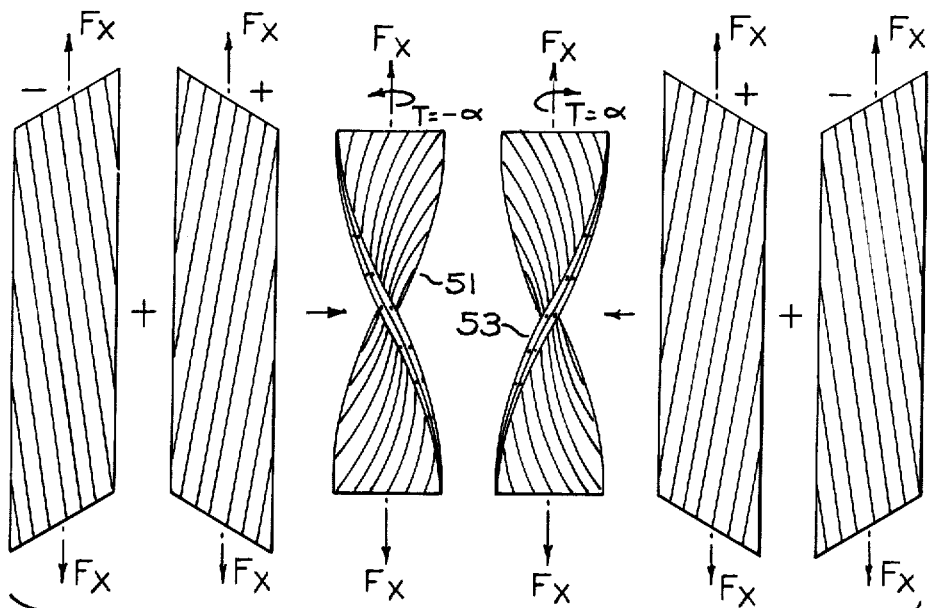
FIG. 5 shows two pairs of two lamina separated from each other, each having spaced parallel cords embedded in an elastomer, and indicates the twist of each pair if it were coupled in the z direction and placed in tension along its x axis.
Figure 6:
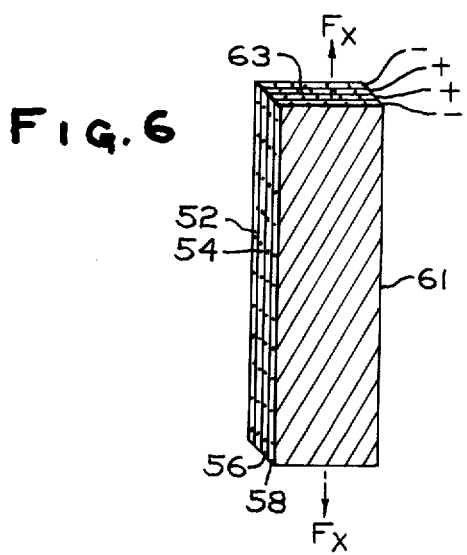
FIG. 6 is a laminate consisting of the two pairs of lamina shown in FIG. 5, superposed with cords directions − + + −, the lamina being coupled in the z direction and the laminate under tension in the x direction.

FIG. 3 shows two separate lamina 31,33 which are placed in tension by forces $F_x$ acting along their x axes. Both lamina have identical properties with the sole exception of the direction of the cord angles 35,37 which are in opposite directions with respect to the x axis. If these lamina were superposed plies in a 2 ply belt 41 for a pneumatic tire, they would be coupled in the z direction. In other words, they would be placed one on top of the other and cured so that the belt would comprise a single structure 41 having two layers of spaced oppositely directed cords. If this two ply belt were then placed under tension along its x axis, the only way it could reach an equilibrium state with respect to the applied forces would be for the belt to twist as shown in FIG. 4. The direction of the twist is dependent upon the orientation of the cords in the plies of the belt. For example, assuming identical construction for each ply except for the direction of the cord angle, a − + belt 51 will twist an amount T=−a which is equal in magnitude but in the opposite direction to the twist T=a from a + − belt 53, FIG. 5. Thus, if a − + belt 51 is placed on top of a + − belt 53 to form a − + + − belt 61, FIG. 6, placing the belt in tension will not cause it to twist because the twist generated by the + − pair will be cancelled by that of the − + pair.

For the − + + − belt 61 described above, the lamina stiffness are oriented in such a way that they are symmetrically arranged with regard to the thickness midplane 63 of the structure. As a result, no in-plane to out-of-plane coupling will exist, that is, tension will not cause twisting. Conversely, bending or twisting will not cause in-plane tension and shear. Moreover, this behavior applies to any combination of cord structure in a belt where the lamina stiffnesses are symmetrically arranged with regard to the thickness midplane of the structure.

The relationship of this result to the causation of ply steer should become apparent upon examination of the properties of an element of a general anisotropic laminate that is bent.

Figure 7A:
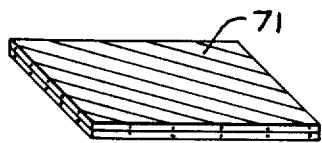
FIG. 7a is a nonsymmetric laminate having a cord structure of either pair of lamina shown in FIG. 5.
Figure 7B:
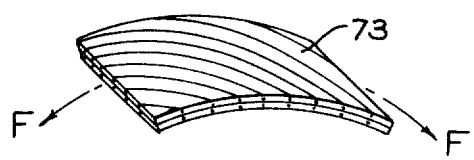
FIG. 7b is the laminate shown in FIG. 7a which is in a bent condition caused by the application of external moments.
Figure 7C:
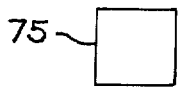
Figure 7D:
FIG. 7d is a midplane element of the laminate shown in FIG. 7b.

A nonsymmetrical laminate is illustrated in FIG. 7a in its condition 71 wherein it is not subject to any applied forces. This laminate assumes the arcuate configuration 73, FIG. 7b, after it is bent about the y axis. A midplane element 75, FIG. 7c, which is an element selected randomly from the midplane of the laminate 71, has a square configuration 75 when the laminate is not bent. However, when the nonsymmetrical laminate is bent as shown in FIG. 7b, the midplane element is deformed from the square configuration 75 into a parallelogram 77, FIG. 7d. Conversely, the midplane element for a laminate which is symmetric with respect to its structural midplane is deformed in bending such that the corners remain at 90°.

Figure 8:
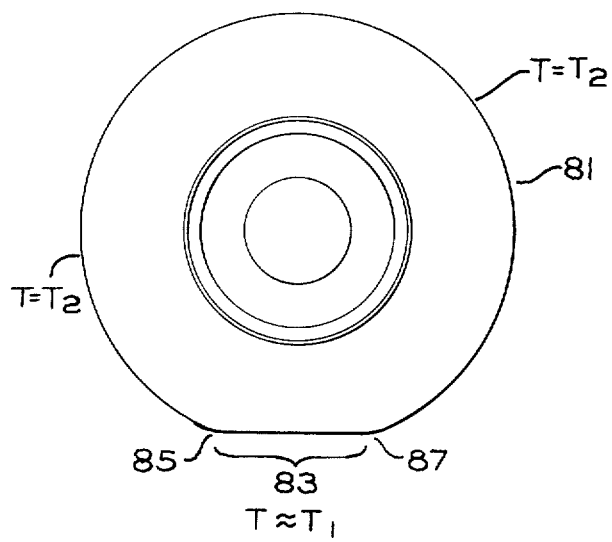
FIG. 8 is a side schematic view of a tire mounted on a vehicle wheel and subjected to a vertical load.

This effect can be easily related to the behavior of a multiple ply belt in a radial tire 81 that is rolling along the road as schematically indicated in FIG. 8. Also in the footprint 83 the belt is bent from its molded, curved, configuration to a flat configuration. It is here that a belt which is nonsymmetrical with respect to its laminate midplane exhibits the deformations that produce the ply steer effect because the bending acting through the in-plane to out-of-plane coupling of the laminate, causes the laminate to exhibit shear.

Figure 9:
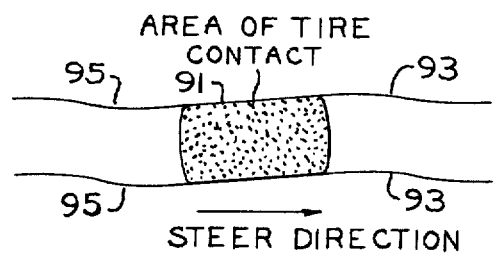
FIG. 9 is a schematic representation of the configuration of those portions of the tread region of the tire which is in contact with and in near proximity to the road surface when the tire is first placed upon the road surface under a load and is not rotating.

FIG. 9 is a schematic representation of the configuration taken by the footprint 91 of a radial tire having a nonsymmetrical belt when the tire is first placed on the ground under a load. The deformation in the fore 93 and aft 95 parts of the footprint is caused by the in-plane shearing strains in the belt produced by flattening the belt in the footprint.

FIG. 10 is a schematic representation of the configuration taken by footprint 101 of a tire on a wheel 102 where the axle (not shown) is held at a fixed steering angle of 0° after the tire has been rolling long enough to build up the steady state ply steer effect. The fore-aft centerline VT of the tread band in the footprint deviates from the velocity vector VC of the center of tire contact by the angular displacement 105, and the lateral force component of ply steer is developed. This angular displacement for a typical passenger radial tire is usually between 0.2 and 0.5 of a degree and is greatly exaggerated in FIG. 10 for the sake of clarity. In a tire having a belt exhibiting ply steer with a normal belt configuration the tread band will always attempt to turn in the direction of the cords in the radially outermost ply when in the footprint of the tire in contact with the road and operating at a zero slip angle.

FIG. 11 is a schematic representation of the configuration taken by a footprint 111 of a tire on a wheel 112 where the axle is free to steer after a steady state ply steer effect has occurred. Here the aligning torque component of the ply steer AT causes the wheel to steer by ½° or less (angle 113 in FIG. 11 is greatly exaggerated for clarity) until a compensating aligning torque induced by the steering is developed and steering ceases. The ply steer lateral force LF ply steer, is then counterbalanced by the lateral force generated by the steered direction of the wheel which is designated as LF steer. The fore-aft centerline VT of the tire tread in the footprint is then in the same direction as the velocity vector VC of the center of tire contact, and the centerline of the wheel 112 is in a configuration such that it is offset by ½° or less from the direction of the velocity of the center of tire contact VC. The direction of the wheel centerline is indicated by VS.

As mentioned previously, a + − − + belt or a − + + − belt will not twist when bent nor will it undergo in-plane shear. Thus, in the area of severe bending of the loaded radial tire, the footprint will not be deformed if the laminate stiffness of the belt is symmetrical with respect to its radial midplane, and the tire will roll in the direction of travel for a tire without conicity.

It is possible to construct many different belt configurations which are symmetrical and thus have no-ply steer characteristics. In the preferred construction, the no-ply steer belt has three belt plies arranged in a + − + orientation with each ply having cords disposed at an angle with respect to the circumferential midplane of the tire which is the same in magnitude, differing only in direction. The belt is free from the ply steer effect because the stiffness is symmetrically distributed with respect to the belt's radial midplane. However, if the ply stock used is the same for all plies there will be twice as many cords in the + direction as there are in the − direction, so that in-plane shear coupling will occur. Although this does not directly affeect the ply steer phenomena, it causes a reduction in wear and reduces the tread life of the tire.

The preferred embodiment of the invention shown in FIG. 12 comprises a radial tire 120 having a three ply belt in which the in-plane stiffness is essentially balanced and in which the stiffness is symmetrically distributed with respect to the radial midplane of the belt. Each ply comprises cords 121 disposed at an acute angle relative to the circumferential midplane. The first ply 122 and third ply 124 each have identical end counts, an equal number of cords per inch, the cord angle also being identical in amount and direction. The second ply 126 has an end count twice that of the first and third plies, the cords having an angle equal in magnitude to that of the cords for plies 122 and 124 but opposite in sense. Each cord 121 is identical in the several plies. The belt can be built into a tire having a radial carcass by procedures well known in the art.

One specific example of the presently preferred embodiment of the invention is a BR 78×13 tire, in which the first belt ply 122 has 9 cords per inch disposed at an angle of +29° in the uncured ply material and is 6 inches in width and 65.8 inches in length. The second ply 126 has 18 cords per inch disposed at an angle of −29° and is 4.80 inches wide and 66.1 inches long. The third or outermost ply 124 also has 9 cords per inch disposed at an angle of +29°, is 5.40 inches wide and 66.4 inches in length. The cords each comprise five strands of 0.25 mm. steel wire filaments embedded in rubber of suitable hardness. After cure, the cord angles have a magnitude of less than 25° and preferably substantially equal to 24°.

The edges of the belt parallel to its circumferential midplane are each top spliced 1 inch with a 2 inch wide 66.7 inch long ply 127 having 20 cords per inch of 840/2 nylon at an angle of substantially 0°. These strips as well as the variation in the width of the belt plies reduce the tendency of the edges of the steel corded belt plies to separate in the shoulder regions 129 of the tire.

It is not critical for purposes of balancing the in-plane stiffness of the belt plies that there be exactly an equal number of cords in each direction. As an example, a + − + belt having 8 cords per inch in the first and third plies and 18 cords per inch in the second ply will perform satisfactorily. However, the departure from equality of numbers of cords in opposite directions must not be excessive.

The preferred embodiment of the invention is not limited to the specific example described above. By way of example, a 5 ply belt may be built having a + − + − + configuration where all of the angles are of the same magnitude. In order to balance the in-plane stiffness where cords of equal stiffness are used the + belt plies would each have ⅔ the number of cords per inch as the − belt plies. Similarly, a 7 ply belt could be constructed having a − + − + − + − construction where the − plies would have ¾ as many cords per inch as the + plies.

In the preceeding examples, it has been assumed that the magnitude of the cord angles, the modulus of the ply rubber, and the cord material and construction has been the same in each belt ply. It should be apparent, however, that the invention may be practiced using a belt having plies in which different cord materials are used in each ply. For instance, a 5 ply belt can be constructed having a + − + − + arrangement where the third ply has steel cords and all the other plies have rayon cords. The out-of-plane coupling is eliminated simply by the + − + − + orientation. The in-plane shear can be eliminated if all of the cords are disposed at angles of equal magnitude and if the following condition is met:

$$EPI_1 = EPI_2 - EPI_3 \frac{Ew}{2ER}$$

where $EPI_1$ is the end count per inch of the cords in the first and last plies; $EPI_2$ is the end count per inch of the cords in the second and fourth plies; $EPI_3$ is the end count per inch of the cords in the third ply; Ew is the initial modulus (or stiffness) of the wire cords, and ER is the initial modulus (or stiffness) of the rayon cords. Similar equations can be derived for any odd number of plies.

The specific embodiments of the invention have been given by way of example and not by way of limitation. For example, by way of illustration and not of limitation, it may be mentioned that the order of sequential arrangement of the ply angle directions in the belt can be reversed from the specific examples given. Various other equivalent constructions are possible which embody the essence of the invention as defined in the claims.

I claim:

1. In a radial ply tire having a belt assembly with an odd number of plies of rubberized mutually parallel cords crossing the circumferential midplane of the tire at an acute angle, the improvement wherein the cords in each of the radially innermost and radially outermost plies of the belt assembly are oriented in the same direction relative to said circumferential midplane while the ply or plies intermediate the radially innermost and radially outermost plies are each characterized by a cord direction and stiffness which effects symmetrical stiffness relative to the thickness midplane of the belt.

2. The tire as defined in claim 1 wherein said belt assembly consists of three plies and the ply intermediate said radially innermost and outermost plies is characterized by a stiffness approximately equal to twice that of either of said radially innermost or radially outermost plies and a cord direction opposite to the direction of the radially outermost and innermost plies.

3. The tire as defined in claim 2 wherein the cord end count of said radially innermost and outermost plies are substantially equal and the cord end count of said intermediate ply is approximately twice that of the cord end count of either said radially innermost or outermost ply.

4. A radial ply tire as defined in claim 3 wherein said acute angle is less than 25°, the end count of each of the radially innermost and outermost plies is 9 cords per inch and the end count of said intermediate ply is approximately 18 cords per inch.

* * * * *